CONELRAD BROADCAST STATION CONTROL DEVICE

Filed Nov. 22, 1961

INVENTOR
Bryant F. Craig

BY Diggins & Le Blanc
ATTORNEY 3,124,749

CONELRAD BROADCAST STATION CONTROL DEVICE

Bryant F. Craig, Arlington, Tex., assignor to Amalga Corporation, Dallas, Tex., a corporation of Texas Filed Nov. 22, 1961, Ser. No. 154,229
7 Claims. (Cl. 325—64)

Figure 2:
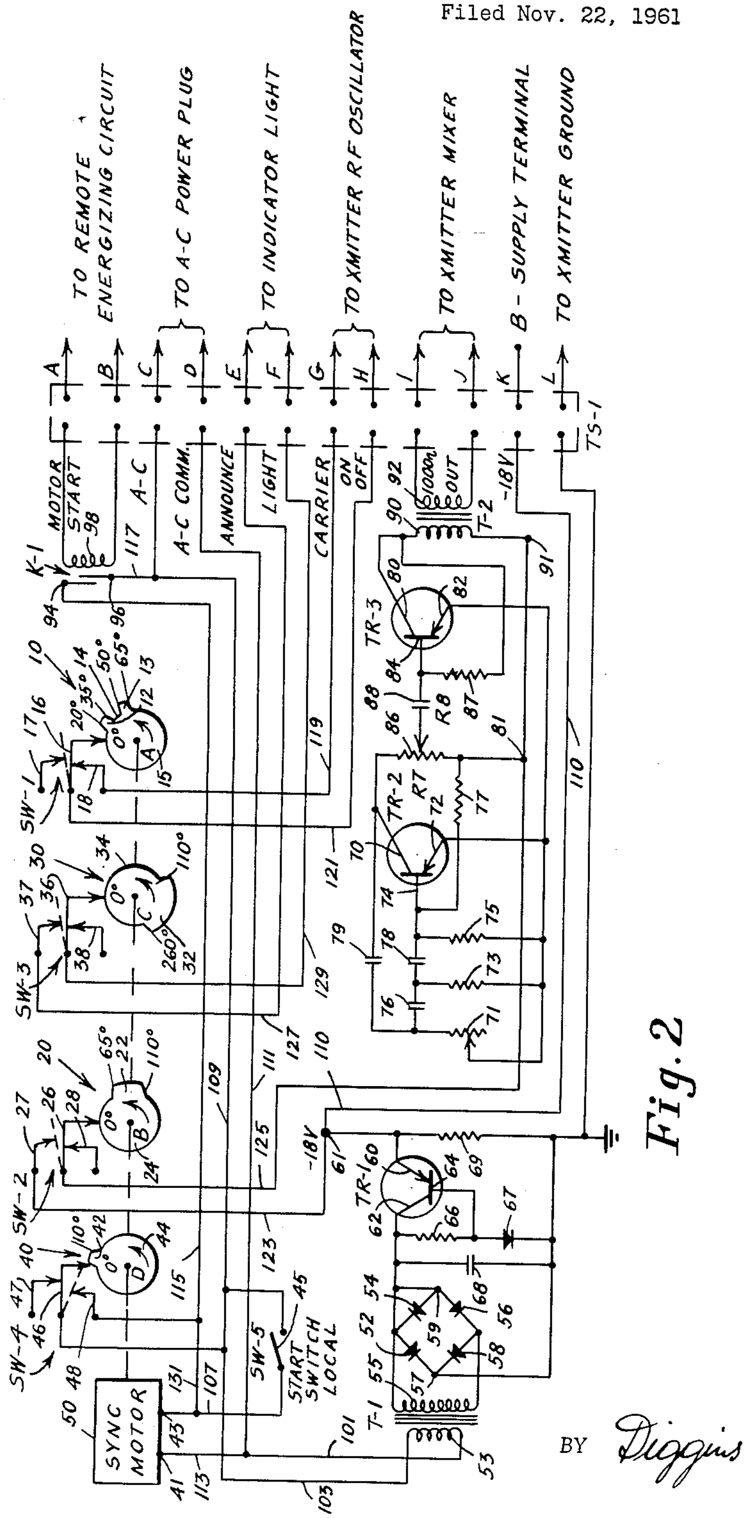

This invention relates to a broadcast station control device and more particularly to a Conelrad control device for automatically controlling a standard radio broadcasting station for the development and transmission of the standard Conelrad code.

Briefly stated, the present invention relates to an electronically actuated signal encoding apparatus which will automatically transmit the standard Conelrad signal code. That is to say, the apparatus of the present invention is adapted to turn On and Off the carrier wave of a standard broadcasting station for sequential intervals in accordance with and pursuant to the standard Conelrad warning system.

At the present time, Civil Defense authorities have established and adopted a standard Conelrad code which consists of the following intervals: (1) five seconds carrier Off, (2) five seconds carrier On, (3) five seconds carrier Off, (4) fifteen seconds carrier On and modulated with a 1,000-cycle signal, and (5) an indefinite period of carrier On and audio modulated with instructions and information. Accordingly, the apparatus of the present invention, which is connected to the transmitter of the standard broadcast station, will automatically turn the carrier wave of that station Off and On during the first three intervals of the Conelrad code signal and then automatically modulate the carrier with a 1,000-cycle tone during the fourth interval of the Conelrad code. In addition, the apparatus of the present invention is adapted to actuate a visual indicator, such as a light, during the fifth interval of the Conelrad code, thereby notifying the local broadcast station announcer that it is time to modulate the carrier wave with instructions and information pertaining to the national emergency.

The instant apparatus may also be used in conjunction with the predetermined Near code, which is transmitted over pre-existing power transmission lines and networks.

Various broadcast station transmitter encoding systems and devices have been known for many years. None, however, is particularly suited for use in conjunction with the present Conelrad warning system and many of the prior known devices require highly complicated equipment and expensive circuit components. The present invention avoids these difficulties by providing a simplified, inexpensive unit which can be easily connected to a standard broadcast station transmitter so as to develop and transmit a signal code and which unit is particularly suited for use in conjunction with the standard Conelrad warning system.

Further, most of the heretofore known standard broadcast station encoding systems rely principally on the fact that, in the event of a national emergency, the broadcast station would be notified by Civil Defense authorities of the impending national emergency and would then discontinue normal transmission of the broadcast station carrier and then transmit the broadcast station carrier pursuant to the Conelrad signal code. Such systems, however, are not completely satisfactory nor effective since emergency circumstances may arise when immediate and timely notification of the national emergency cannot be relayed to the standard broadcast station. It is apparent, therefore, that systems operating on the above-mentioned principle may not adequately and timely inform the general public of the imminent and impending national emergency.

Still further, most of the heretofore known standard broadcast station transmitter control devices require specific and cumbersome procedures for attaching the device to the transmitter. Such arrangements are often objectionable in that the normal operation or use of the standard broadcast station transmitter is impaired or the cost for connecting the device to the transmitter is considerable.

In addition, the heretofore known standard broadcast station transmitter control devices require the continuous operation of the entire control device whereas the device and principles of the present invention permit conventional transistorized oscillator and rectifier circuits to be uniquely modified so as to develop the Conelrad signal code and yet not require the continuous full operation of the apparatus, thereby resulting in a noticeable economy of operation.

While the present invention may be used in a variety of civilian, industrial and governmental applications, the principle of operation makes it particularly useful for the unattended development and transmission of Conelrad code signals. Accordingly, the present invention may be used for Civil Defense purposes by operators of radio broadcasting equipment and by commercial, industrial or amateur services which are presently required by law to have available Conelrad encoding equipment in order that radio broadcasting, except for Civil Defense purposes, may be discontinued during a national emergency after the transmission of the Conelrad code signal.

The present invention avoids the above set forth difficulties by providing a simplified and inexpensive device capable of developing and transmitting a signal code indicative of a national emergency and which device is particularly suited for use in conjunction with the standard Conelrad system as well as the standard Near system.

It is therefore a primary object of the present invention to provide a novel standard broadcasting station transmitter encoding device capable of use for Civil Defense purposes by operators of radio broadcasting equipment and by commercial, industrial or amateur services which are presently required by law to have available transmitter carrier frequency encoders.

Another object of the present invention is to provide a unique encoding system for developing and transmitting a signal code indicative of a national emergency.

Still another object of the present invention is to provide an inexpensive standard radio broadcast station transmitter encoding device particularly suited for use in conjunction with the existing Conelrad warning system.

Yet still another object of the present invention is to provide a unique standard radio broadcast station transmitter encoding device which is capable of controlling the transmission of the Conelrad signal code and yet does not require the continuous full operation of the apparatus, thereby resulting in economy of operation.

A further object of the present invention is to provide a novel transmitter control device whereby the standard Conelrad signal code is automatically transmitted upon momentary actuation of the device.

A still further object of the present invention is to provide a unique transmitter control apparatus which is capable of energizing and deenergizing the transmitter so that sequential intervals of transmitter carrier wave On and Off results and to thereafter modulate the transmitter carrier wave with an audio tone signal and finally permit audio modulation of the transmitter carrier wave with instructions and information pertaining to an impending national emergency.

A still further object of the present invention is to provide a radio transmitter control device wherein an unattended standby circuit is momentarily energized in the event of a national emergency and which circuit automatically actuates the transmitter of a standard radio broadcasting station in accordance with and pursuant to the standard Conelrad signal code, thereby resulting in a radio transmitted warning of an impending national emergency.

An additional object of the present invention is to provide a novel radio transmitter control device particularly suited for use in conjunction with the existing Conelrad warning system which is simple in construction, economical to manufacture and highly reliable in performing the function intended.

Figure 1:
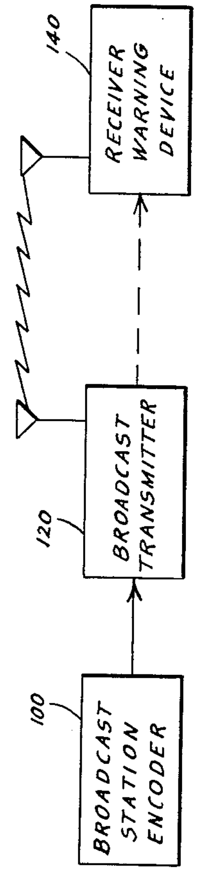

These and further objects and advantages of the invention will be more apparent upon reference to the following specification, claims and appended drawings wherein:

FIGURE 1 is a block diagram of a radio system in accordance with the present invention; and FIGURE 2 is a detailed circuit diagram of the encoder portion of the radio warning device of the present invention.

While the present invention is described in conjunction with, and is particularly suited for use with, the existing Conelrad radio warning system, the present invention has utility in conjunction with other emergency warning purposes, such as general broadcast information, tornado, hurricane and other weather warnings, police and fire warnings, and other emergency warnings.

In the event of an enemy bomber or missile attack, it is well known that the general public must be immediately notified of the imminent and impending disaster so that they may take cover, evacuate and make other arrangements essential to their survival during and immediately after an attack. Accordingly, a highly reliable and accurate radio transmitter encoding device is essential so that the populace may be immediately and accurately informed of the impending national emergency. At the present time, Civil Defense authorities have established a national emergency signal code which will be transmitted via existing standard broadcast station transmitters and it is necessary to the success of this system of warning that broadcast stations have available the equipment capable of transmitting the emergency code signal.

Up to the present time, most broadcast stations have available equipment which is manually operated by employees of the broadcasting station so as to transmit the carrier frequency of that broadcast station in accordance with the national emergency signal code. One disadvantage of this type of a system is the possibility of error on the part of the broadcasting station employee in transmitting the national emergency signal code. Also, such systems prevent the employee of the broadcast station from taking cover or making arrangements for his own survival. Obviously, a system which can be remotely energized or initially energized by an employee of the broadcast station and which will thereafter automatically transmit the broadcast station carrier wave in accordance with the national emergency signal code would overcome the above-mentioned disadvantages of the presently available systems.

The novel radio transmitter control device of the present invention may be incorporated in a small transistorized container and permanently connected to the conventional transmitter of the standard radio broadcast station.

Upon receipt of a remotely originated energizing signal, or upon actuation of a start switch of the device, the device of the present invention is actuated and caused to uniquely control the transmission of the broadcast station transmitter carrier wave and to uniquely modulate the carrier frequency with an audio tone, thereby transmitting to the general public a warning pursuant to the national emergency signal code. Further, the device of the present invention is operative through an entire 24-hour day on an automatic basis so that it does not depend upon the standard radio broadcast station being on the air since it can be remotely energized to transmit the national emergency signal code.

Briefly, the device of the present invention, when energized, causes a plurality of single-pole, double-throw switches to be sequentially opened and closed in accordance with the Conelrad signal code. That is to say, the first switch is caused to open and close for predetermined periods whereby the broadcast station transmitter is energized and deenergized, thereby resulting in periods of transmission of the carrier wave separated by periods of non-transmission of the carrier wave. Another switch is adapted to connect a local oscillator with the broadcast station transmitter, thereby resulting in audio tone modulation of the carrier wave of the broadcast station transmitter. Still another switch is adapted to connect energizing potential of the control device to a visual indicator such as a light, thereby informing the broadcast station operator that audio modulation of the carrier with instructions and information can be commenced. And, finally, another switch is adapted to hold the control device in an energized position until one cycle of operation (i.e., the Conelrad signal signal code has been transmitted) has been completed, and then to deenergize the control device and place it in condition of readiness for any subsequent national emergency operation.

Referring now to FIGURE 1, wherein a block diagram of a warning system is shown, the standard broadcast station transmitter 120 has connected thereto a broadcast station encoder 100. When the encoder 100 is energized, the broadcast transmiter 120 is caused to transmit carrier wave frequency pursuant to a predetermined national emergency signal code such as the Conelrad signal code. The transmitted signal code of transmitter 120 is received by a receiver warning device 140 and is there decoded and caused to actuate the signal responsive device such as bells, alarms, speakers, etc.

Referring now to FIGURE 2, wherein a detailed circuit diagram in accordance with the present invention is shown, a synchronous motor 50 is coupled to and drives cams 10, 20, 30 and 40. Energizing voltage for the motor 50 is provided through 110-volt, 60-cycle alternating current power supply which is connected at terminals C and D of plug TS–1 (see upper right-hand portion of FIGURE 2). The 110-volt A.C. signal is applied across the primary 53 of power transformer T–1. The power transformer T–1 includes a step-up secondary coil 55 which is connected across a conventional full-wave diode bridge rectifier comprising diodes 52, 54, 56 and 58. The rectified A.C. volt appears across diode bridge output terminals 57 and 59 across which is connected a filter and smoothing capacitor 68. The terminal 57 is directly connected to ground and the terminal 59 is directly connected to the collector electrode of transistor TR–1. The collector electrode of transistor TR–1 is connected to ground through a series connected limiting resistor 66 and diode 67. The base electrode of transistor TR–1 is connected to the juncture of resistor 66 and diode 67. The emitter electrode 60 is connected through the load resistor 69 to ground. A negative 18 volt potential is developed across resistor 69 and is available at B— output terminal 61.

Referring to the upper right-hand portion of FIGURE 2, there is shown a multi-terminal plug TS–1 having terminals A to L. The specific circuit relationship and connections of terminals A to L of plug PS–1 will be discussed more fully hereinbelow. However, it will suffice at this time to merely mention that plug TS–1 will be inserted into a corresponding receptacle of the local broadcast station transmitter.

Referring now to the upper left-hand portion of FIGURE 2, the cams 10, 20, 30 and 40 are connected to the sync motor 50 and caused to rotate counterclockwise. Positioned in close proximity to the outer periphery of each cam is a single-pole, double-throw switch SW–1, SW–2, SW–3 and SW–4. The swinger of each switch abuts the outer periphery of its corresponding cam so as to constitute a cam and follower unit. Cam 10 comprises a circular portion 15 and raised portions 12 and 13. The camming surfaces 12 and 13 are 15° in arcuate length and are separated by a 15° base line surface 14. The raised portion 12 begins at an angle 20° from the vertical and ends at an angle 35° from the vertical, and the raised portion 13 begins at an angle 50° from the vertical and ends at an angle 65° from the vertical. The switch SW–1 includes a swinger or follower 16 and two stationary contacts 17 and 18. When the swinger 16 is on the upper surface of either portion 12 or 13 of cam 10, the swinger will be in the position shown by the dotted line. The contact 18 of switch SW–1 is connected to terminal G of plug TS–1 and swinger 16 of switch SW–1 is connected to terminal H of plug TS–1. Contact 17 is a floating contact and merely restricts the movement of swinger 16 as it follows the cam 10. The operation of cam 10 and switch SW–1 will be discussed more fully hereinbelow.

Cam 20 comprises a circular portion 24 and a raised portion 22. The raised portion 22 begins at an angle of 65° from the vertical and ends at an angle of 110° from the vertical. Switch SW–2 includes a swinger or follower 26 and stationary contacts 27 and 28. When swinger 26 is on the upper surface of raised portion 22 of cam 20, it moves to the position shown by the dotted line. Swinger 26 is connected to primary 90 of audio output transformer T–2 and contact 27 is connected to the B— terminal 61. Contact 28 is a floating contact and merely restricts the movement of swinger 26.

Cam 30 comprises a circular portion 34 and a raised portion 32. The raised portion 32 begins at an angle of 110° from the vertical and ends at an angle of 260° from the vertical. The switch SW–3 includes a swinger or a follower 36 and stationary contacts 37 and 38. Swinger 36 is connected to terminal F of plug TS–1, and contact 37 is connected to terminal E of plug TS–1. Contact 38 is a floating contact and merely restricts the movement of swinger 36.

Cam 40 comprises a circular portion 44 and a raised portion 42. The raised portion 42 begins at the vertical and ends at an angle of 10° from the vertical. Switch SW–4 includes a swinger or follower 46 and stationary contacts 47 and 48. Swinger 46 is connected to terminal C of plug TS–1 and contact 48 is connected to contact 94 of energizing relay K–1 and to terminal 43 of sync-motor 50. Contact 47 is a floating contact and merely restricts the movement of swinger 46. The terminal 41 of motor 50 is connected to terminal D of plug TS–1 and terminal 43 of motor 50 is connected to terminal C of plug TS–1 through Start switch SW–5. Start switch SW–5 is a single-pole, single-throw switch having a swinger 45.

Referring now to the upper right-hand portion of FIGURE 2, the energizing relay K–1 comprises an energizing coil 98 and contacts 94 and 96. The energizing coil 98 has its upper end connected to terminal A of plug TS–1 and its lower end connected to terminal B of plug TS–1. Contact 96 of relay K–1 is connected to terminal C of plug TS–1 and contact 94 of relay K–1 is connected to terminal 43 of motor 50.

Referring now to the middle portion of FIGURE 2, a conventional transistor oscillator is shown which comprises a transistor TR–2 having a collector 70, an emitter 72 and a base 74. The output of the conventional transistor oscillator is developed across output load resistor 86 and is capacitively coupled to transistor amplifier TR–3 through capacitor 88. The capacitor 88 has one end connected to the slider of potentiometer 86 and the other end connected to the base 84 of transistor TR–3. The amplified output of transistor TR–3 is developed across the primary 90 of output transformer T–2. The transistor oscillator TR–2 and the transistor amplifier TR–3 are conventional and a specific and detailed description of the operation thereof is not considered necessary since the oscillator may be any oscillator capable of generating a desired frequency and the amplifier may be any amplifier capable of amplifying that frequency. The operating potentials for the transistors TR–2 and TR–3 are delivered from the B— terminal 61 through contact 27 and swinger 26 to the terminals 81 and 91. Thus, it can be seen that the transistors TR–2 and TR–3 are normally non-conductive and are rendered conductive whenever cam 20 moves swinger 26 into the position shown by the dotted line.

Referring now to the middle right-hand portion of FIGURE 2, audio output transformer T–2 comprises a primary 90 and a secondary 92. Primary 90 is connected between the collector 80 of transistor TR–3 and the terminal 91. Secondary 92 has its upper end connected to terminal I of plug TS–1 and its lower end connected to terminal J of plug TS–1. In the illustration shown in FIGURE 2, the frequency of the transistor oscillator is shown as being 1,000 cycles per second which is amplified by transistor amplifier TR–3 and coupled by audio output transformer T–2 to terminals I and J of plug TS–1. That is to say, a 1,000-cycle per second signal will be available across the terminals I and J of plug TS–1.

Referring again to the upper right-hand portion of FIGURE 2, the multi-terminal plug TS–1 has a plurality of terminals A to L which are adapted to be plugged into the broadcast station transmitter. Terminals A and B are connected to any conventional remote energizing circuit, for example, switching means adapted to be remotely actuated for applying a negative voltage to the energizing coil 98 of relay K–1. Terminals C and D are connected to a conventional 110-volt, 60-cycle alternating current power supply. Terminals E and F are connected to a visual indicator such as a light or the like. Terminals G and H are connected to the transmitter radio frequency oscillator stage so that the RF frequency of the transmitter may be interrupted or disconnected by the switch SW–1 when swinger 16 thereof is engaging contact 17. Terminals I and J are connected to the transmitter mixer stage so that the 1,000-cycle output from audio output transformer T–2 may be superimposed upon or caused to modulate the RF frequency of the transmitter. Terminal K is the B— supply terminal which may have utility and use in the transmitter itself. Terminal L is connected to the transmitter ground.

*Cycle of Operation*

Assuming that the synchronous motor 50 is deenergized, the transistor oscillator TR–2 and the transistor amplifier TR–3 are normally non-conducting, and cams 10, 20, 30 and 40, switches SW–1, SW–2, SW–3, SW–4 and SW–5 and relay K–1 are in the position as shown in FIGURE 2. Accordingly, the local broadcast station transmitter is broadcasting in a normal manner.

A cycle of operation of the apparatus of the present invention may be commenced by either closing the Start switch SW–5 or remotely energizing the relay K–1 through terminals A and B of the plug TS–1. If start switch SW–5 is manually closed by an employee of the broadcast station, energizing voltage is applied to the motor 50 through the circuit path including terminal 43, lead 107, switch SW–5, lead 109, terminal C, terminal D, lead 111, lead 113 and terminal 41. Alternatively, energizing voltage may be applied to the motor 50 by remote energization of relay K–1. That is to say, when coil 98 of relay K–1 is energized, the contacts 94—96 are caused to close and the energizing voltage is applied through the circuit comprising terminal 43, lead 115, contacts 94 and 96, lead 117, terminal C, terminal D, lead 111, lead 113 and terminal 41.

When synchronous motor 50 is energized, it causes cams 10, 20, 30 and 40 to rotate counterclockwise. When the portion 12 of cam 10 causes swinger 16 to engage contact 17 of switch SW–1, the RF frequency developed by the transmitter (not shown) is disconnected since the RF frequency of the transmitter travels the circuit path including terminal G, lead 119, contact 18, swinger 16, lead 121 and terminal H. The angular distance of portion 12 of cam 10 is 15° and the angular speed of cam 10 is predetermined to the extent that swinger 16 will be caused to engage contact 17 of switch SW–1 for a five-second interval. Thus, when swinger 16 is engaged by portion 12 of cam 10, the RF frequency or carrier frequency of the transmitter is not transmitted for a five-second interval. After this five-second interval, the swinger 16 engages the base line 14 of cam 10 and the swinger 16 engages contact 18 of switch SW–1. Thus, the carrier frequency is again connected in the transmitter for normal transmission. The angular distance of portion 14 is 15° and the relationship between this distance and the angular speed of cam 10 permits transmission of the carrier frequency for a second five-second interval. Thus, the carrier frequency will be transmitted for an interval of five seconds. When the swinger 16 engages the portion 13 of cam 10, the swinger is again caused to engage contact 17 of switch SW–1. The angular distance of portion 13 is 15° and the relationship of that distance and the angular speed of cam 10 again holds swinger 16 in engagement with contact 17 for a third five-second interval. Thus, the carrier frequency is again disconnected and prevented from being transmitted during this third five-second interval. When the swinger 16 engages the portion 15 of cam 10, the swinger 16 engages contact 18 and the carrier frequency of the transmitter is again normally transmitted.

Accordingly, it will be seen that cam 10 as it rotates through an angle of 65°, will cause the carrier frequency of the transmitter to be intermittently connected and disconnected within the transmitter, thereby resulting in a first and second five-second interval of non-transmission of the carrier frequency separated by a five-second interval of transmission of the carrier frequency. It will be recalled that this connection and disconnection of carrier frequency is pursuant to and in accordance with the first three five-second intervals of the above-mentioned Conelrad signal code.

Referring now to cam 20, after the motor 50 has caused the cams to move an angle of 65°, the portion 22 of cam 20 will engage swinger 26 of switch SW–2 and cause swinger 26 to engage contact 27 of switch SW–2. When swinger 26 engages contact 27, the B— potential available at terminal 61 is connected to terminals 81 and 91 for the purpose of providing energizing voltages for transistors TR–2 and TR–3, respectively, through the circuit path including B— terminal 61, lead 123, contact 27, swinger 26, lead 125, terminal 81 and terminal 91. The angular distance of raised portion 22 of cam 20 is 45° and the relationship between this angular distance and the angular speed of cam 20 is such that swinger 26 is caused to engage contact 27 for a 15-second interval. Thus, the oscillations developed by transistor oscillator TR–2 and amplified in transistor amplifier TR–3 are coupled across audio output transformer T–2 to terminals I and J of plug TS–1 to the mixer stage of the transmitter. Therefore, during this 15-second interval, when portion 22 engages swinger 26, the 1,000-cycle frequency coupled to the mixer stage of the transistor will modulate the carrier frequency and be transmitted by the transmitter. It will be recalled that this 15-second interval is pursuant to and in accordance with the fourth interval of the above-mentioned Conelrad signal code.

Referring now to cam 30, when the motor 50 has moved the cams an angular distance of 110°, the portion 32 of cam 30 engages swinger 36 of switch SW–3. When swinger 36 is engaged by portion 32, the swinger 36 is caused to engage contact 37 of switch SW–3, thereby closing the visual indicator circuit. The visual indicator circuit, including a suitable power source, is connected to terminals E and F of plug TS–1 and the cam 30 closes this circuit through the series path including terminal E, lead 127, contact 37, swinger 36, lead 129 and terminal F. The angular distance of portion 32 of cam 30 is 150° beginning at an angle 110° from the vertical and ending at an angle 260° from the vertical, therefore holding swinger 36 in engagement with contact 37 for an interval of approximately 50 seconds. When the swinger 36 engages the portion 32 of cam 30, a visual indicator, such as a light, will be energized so as to notify an employee of the broadcast station that audio modulation of the carrier with instructions and information pertaining to the national emergency can commence or a device having a prerecording of instructions and information pertaining to a national emergency may be energized by the movement of swinger 36 in engagement with contact 37. In any event, whether an employee audio modulates the carrier wave or whether a device having a prerecording modulates the carrier wave, the audio signals are delivered to the mixer stage of the transmitter in the normal broadcast manner for modulation and transmission to the general public.

Referring to cam 40, when the motor 50 has moved the cam so that raised portion 42 of cam 40 is engaging swinger 46 of switch SW–4, swinger 46 is caused to engage contact 47 of switch SW–4. Thus the energizing voltage for motor 50 is disconnected and the motor caused to stop. It will be recalled that a cycle of operation of the apparatus of the present invention was commenced by either the manual closing of Start switch SW–5 or by remote energization of relay K–1. It should be noted that the closure of switch SW–5 or the energization of relay K–1 need only be for a period sufficient to cause portion 42 of cam 40 to be moved out of engagement with swinger 46 of switch SW–4. The angular distance of portion 42 of cam 40 is 10° and the relationship of that distance to the angular speed of cam 40 merely requires that switch SW–5 or relay K–1 be actuated or energized, respectively, for a period not exceeding five seconds whereby swinger 46 will be in engagement with portion 44 of cam 40 and caused to engage contact 48 of switch SW–4 thereby delivering energization voltage to motor 50 through the circuit path including terminal C, lead 109, swinger 46, contact 48, lead 131, lead 107, terminal 43, terminal 41, lead 113, lead 111 and terminal D. Therefore, once switch SW–5 or relay K–1 is actuated or energized, respectively, the motor 50 is locked into an energized condition for at least one revolution of cam 40 or a period of approximately 115 seconds, at which time the portion 42 of cam 40 will engage swinger 46 and disconnect the energizing voltage from the motor 50. The apparatus of the present invention will then be in readiness for a subsequent cycle of operation.

It will therefore be noted that the apparatus of the present invention controls the standard broadcast station transmitter so that it will first transmit the carrier frequency of the transmitter for a five-second interval, disconnect transmission of the carrier for a five-second interval, transmit carrier frequency for a five-second interval, transmit carrier frequency modulated with a 1,000-cycle signal for a 15-second interval and transmit carrier frequency audio modulated with instructions and information pertaining to the national emergency for an indefinite period limited only by the shut-down of the transmitter itself. Further, at the completion of the 15-second interval wherein carrier frequency is modulated with a 1,000-cycle signal, a visual indicator is energized for the purpose of notifying the operator of the device that audio modulation of the carrier frequency with instructions and information may commence. Finally, the control unit is deenergized and returned to a condition in readiness for any subsequent cycle of operation.

It will be apparent from the foregoing that the device of the present invention is low in cost, rugged in construction and requires very little maintenance. The use of energizing relay K–1 provides a feature whereby the device may be remotely controlled, thereby eliminating the necessity that an employee of a standard broadcast station be available to commence a cycle of operation of the device. Further, the use of transistors in the oscillator and amplifying portions, as well as the rectifying portion, provides reliability, accuracy and efficiency.

It is further apparent from the above that the present invention provides a simple and inexpensive standard broadcast station transmitter control device capable of controlling the transmitter so that a signal code similar to the Conelrad signal code may be transmitted automatically. Further, the control system of the present invention is operative both day and night notwithstanding the operativeness of the broadcast station transmitter since operating potentials for the transmitter are available at terminal K of plug TS–1. Therefore, whenever it is desirable or necessary to transmit the Conelrad signal code, the control device of the present invention may be remotely energized so as to automatically broadcast the Conelrad signal code for the purpose of warning the general public of an impending and imminent national emergency. Although the device of the present invention may be remotely controlled, it may also be energized by the manual actuation of Start switch SW–5 by an employee of the broadcast station.

From the foregoing, it will be seen that the present invention is uniquely adapted to obtain all of the ends and objects hereinbefore set forth, together with other advantages which are obvious and which are inherent in the device.

It will be understood that certain features and subcombinations are of utility and may be employed without reference to other features and subcombinations. This is contemplated by and is within the scope of the appended claims.

It is to be further understood that the control device of the present invention may be readily modified so as to be adapted to control the transmission of any warning signal code which may be adopted by governmental authorities for the purpose of notifying the populace of an imminent and impending emergency without departing from the scope of the invention. Accordingly, the hereinabove described Conelrad signal code system is merely exemplary of one of the presently adopted Civil Defense systems to which the device of the present invention is capable of producing and should not be construed as restricting or limiting. By way of example, the device of the present invention may be modified to produce a signal code for a system which utilizes power transmission lines or telephone lines as the means for linking the signal between the transmitter and the receiver. A system of the latter type has been adopted by Civil Defense authorities and is commonly referred to as the Near warning system. Thus, a modification of the device of the present invention so as to produce the Near signal code is clearly contemplated and requires only minor circuit changes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An emergency warning system for audibly informing the general public of an impending national emergency comprising: a transmitter for transmitting signals; a receiver being responsive to said signals; and a control unit connected to said transmitter for sequentially disabling said transmitter in accordance with a predetermined signal code and for modulating said signals during a predetermined interval of said signal code; said control unit including a frequency developing means, at least two switches, one for sequentially disabling said transmitter in accordance with said signal code and another for coupling the output of said frequency developing means to said transmitter during said predetermined interval of said signal code; said signal code comprising two five second intervals of non-transmission of said signals separated by a five second interval of transmission of said signals and followed by a fifteen second interval of transmission of said signals modulated with the output of said frequency developing means and wherein said control unit further includes a visual indicator with said indicator being actuated at the end of said fifteen second interval of said signal code by said control unit, and means for momentarily energizing said control unit either locally or remotely, said receiver developing and reproducing the modulation of said signals when transmitted in accordance with said signal code for audibly informing the general public of an impending national emergency.

2. An emergency warning system for informing the populace of an impending national emergency comprising: a control device for developing a predetermined signal code; a transmitter connected to said control device for transmitting a predetermined carrier wave; a receiver for developing and reproducing said carrier when transmitted by said transmitter; said control device including a plurality of switches and an oscillator, a first switch being connected to said transmitter for intermittently interrupting the transmission of said carrier in accordance with said signal code; a second switch being connected to said oscillator and coupling the output of said oscillator to said transmitter for modulating said carrier during a predetermined interval of said signal code, said control device further including switch actuating cam means and cam drive means; said drive means driving said cam means at a predetermined rate, said cam means intermittently actuating said first switch in accordance with said signal code for intermittently interrupting the transmission of said carrier and actuating said second switch during said predetermined interval of said signal code for coupling the output of said oscillator to said transmitter and means for momentarily energizing said drive means either locally or remotely, and said control device further including a third and a fourth switch, a light and an energizing voltage; said third switch, when actuated, causing said light to be energized; said cam means actuating said third switch at the end of said predetermined interval of said signal code thereby energizing said light for visually indicating the end of said signal code; said fourth switch, when actuated, ensuring the application of said energizing voltage to said drive means for a predetermined period, and said cam means actuating said fourth switch at the beginning of said signal code thereby ensuring energization of said drive means for said predetermined period, and de-actuating said fourth switch at the end of said predetermined period thereby de-energizing said drive means whereby said control device is rendered in readiness for a subsequent cycle of operation, and said receiver being responsive to said carrier when transmitted with said signal code to develop and reproduce the output of said oscillator for informing the populace of an impending national emergency.

3. An emergency warning system in accordance with claim 2 wherein: said signal code comprises predetermined intervals of non-transmission of said carrier separated by predetermined intervals of transmission of said carrier and followed by a predetermined interval of said carrier modulated with the output of said oscillator; and said predetermined period is at least longer than the summation of said intervals of said signal code.

4. An emergency warning system in accordance with claim 2 wherein: said signal code comprises two five second intervals of non-transmission of said carrier separated by a five second interval of transmission of said carrier and followed by a fifteen second interval of transmission of said carrier modulated with the output of said oscillator; and said predetermined period is at least longer than thirty seconds.

5. A control device for controlling the transmission of a carrier wave by a transmitter in accordance with a predetermined signal code comprising: first and second switches; switch actuating cam means; drive means connected to said cam means for driving said cam means at a predetermined rate; means connected to said drive means for energizing said drive means either locally or remotely; an oscillator for developing a predetermined frequency; said first switch being connected to said transmitter and intermittently disabling said transmitter when actuated for interrupting the transmission of said carrier in accordance with said signal code; said second switch being connected to said oscillator and coupling said frequency to said transmitter when actuated for modulating said carrier during a predetermined interval of said signal code; said cam means actuating said first switch in accordance with said signal code and actuating said second switch during said predetermined interval of said signal code whereby said transmitter is controlled so as to transmit said carrier in accordance with said signal code and modulate said carrier with said frequency during said predetermined interval of said signal code, said control device further including a third and a fourth switch, a light, and an energizing voltage; means connected between said driving means and said energizing voltage for initially energizing said drive means; said third switch being connected to said light and energizing said light when actuated by said cam means for providing a visual indication of the end of said signal code; said fourth switch being connected between said drive means and said energizing voltage and supplying said energizing voltage to said drive means when actuated by said cam means for ensuring continued energization of said drive means for a predetermined period; and said cam means actuating said third switch at the end of said predetermined interval of said signal code, actuating said fourth switch at the beginning of said signal code and de-actuating said fourth switch at the end of said predetermined period whereby said drive means being energized during said predetermined period thereby ensuring a complete cycle of operation of said control device.

6. A control device in accordance with claim 5 wherein said means for energizing said drive means includes: a single pole single throw switch for locally energizing said drive means until said fourth switch is actuated; and a relay actuated switch for remotely energizing said drive means until said fourth switch is actuated.

7. A control device in accordance with claim 5 whereby said signal code comprises a first and second five second interval of non-transmission of said carrier separated by a five second interval of transmission of said carrier followed by a fifteen second interval of transmission of said carrier modulated with said frequency and said predetermined period is at least longer than thirty seconds.

References Cited in the file of this patent

UNITED STATES PATENTS

| | | |
|---|---|---|
| 2,225,464 | Santino | Dec. 17, 1940 |
| 2,280,421 | Chappell et al. | Apr. 21, 1942 |
| 2,459,281 | McDonald | Jan. 18, 1949 |
| 2,728,074 | Cesareo | Dec. 20, 1955 |
| 2,879,383 | Powell | Mar. 24, 1959 |

FOREIGN PATENTS

| | | |
|---|---|---|
| 707,702 | France | July 11, 1931 |

OTHER REFERENCES

Jacobson et al.: "An Air Raid Alarm . . .," Radio and Television News, November 1956, pp. 60, 61 and 140.